United States Patent [19]
Anderson et al.

[11] Patent Number: 5,848,295
[45] Date of Patent: Dec. 8, 1998

[54] SYSTEM FOR ALLOCATING COMMON MEMORY IN CACHE SUCH THAT DATA IS MAINTAINED WHEN EXITING FIRST PROGRAMMING STRUCTURE AND ENTERING SECOND PROGRAMMING STRUCTURE

[75] Inventors: Eric C. Anderson, San Jose; A. Phillip Sohn, Campbell, both of Calif.

[73] Assignee: Apple Computer, Inc., Cupertino, Calif.

[21] Appl. No.: 483,829

[22] Filed: Jun. 7, 1995

Related U.S. Application Data

[63] Continuation of Ser. No. 954,902, Sep. 30, 1992, abandoned.
[51] Int. Cl.⁶ .................................................. G06F 15/00
[52] U.S. Cl. ........................... 395/827; 395/840; 395/680
[58] Field of Search ................................... 395/650, 375, 395/800, 250

[56] References Cited

U.S. PATENT DOCUMENTS

| | | | |
|---|---|---|---|
| 4,528,624 | 7/1985 | Kamionka et al. | 395/425 |
| 4,594,682 | 6/1986 | Drimak | 395/800 |
| 4,674,033 | 6/1987 | Miller | 395/478 |
| 4,907,151 | 3/1990 | Bartlett | 395/425 |
| 4,991,088 | 2/1991 | Kam | 395/425 |
| 5,123,108 | 6/1992 | Olson et al. | 395/800 |
| 5,161,215 | 11/1992 | Kouda et al. | 395/250 |
| 5,247,616 | 9/1993 | Berggren | 395/200 |
| 5,315,707 | 5/1994 | Seaman et al. | 395/250 |
| 5,394,545 | 2/1995 | Emrick et al. | 395/600 |
| 5,418,913 | 5/1995 | Fujimoto | 395/200 |
| 5,434,975 | 7/1995 | Allen | 395/200 |
| 5,539,896 | 7/1996 | Lisle | 395/477 |
| 5,553,267 | 9/1996 | Herlihy | 395/474 |

*Primary Examiner*—Thomas C. Lee
*Assistant Examiner*—Anderson I. Chen
*Attorney, Agent, or Firm*—Blakely, Sokoloff, Taylor & Zafman

[57] ABSTRACT

A method and means for allocating memory for a multiple program structure is described. The present invention includes a method and means for specifying a connection between the programming structures. The present invention also includes a method and means for connecting the programming structures by pointing the input data location of one of the programming structures to the output data location of the preceding programming structure, such that the buffer location used for storing data output from one programming structure becomes the buffer location used to input data into the next programming structure. The present invention also includes a method and means for creating an inter-task buffer. The inter-task buffer is created by first adding a first task which opens the inter-task buffer. The inter-task buffer is completed by adding another task directly after the first task. This second task closes the inter-task buffer. Adding a task between the first and second task takes the output buffer list as its input task list and takes the input buffer list as its output task list.

36 Claims, 6 Drawing Sheets

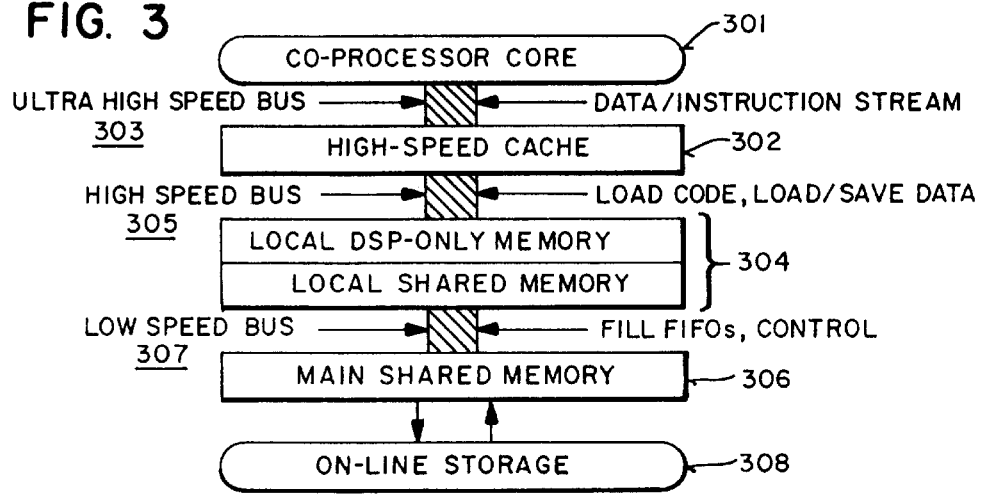
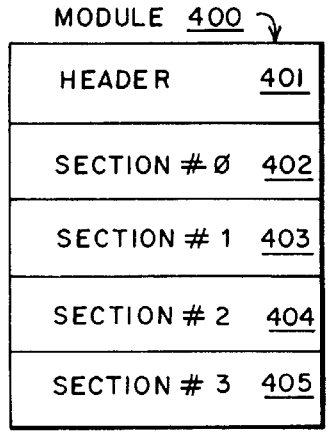
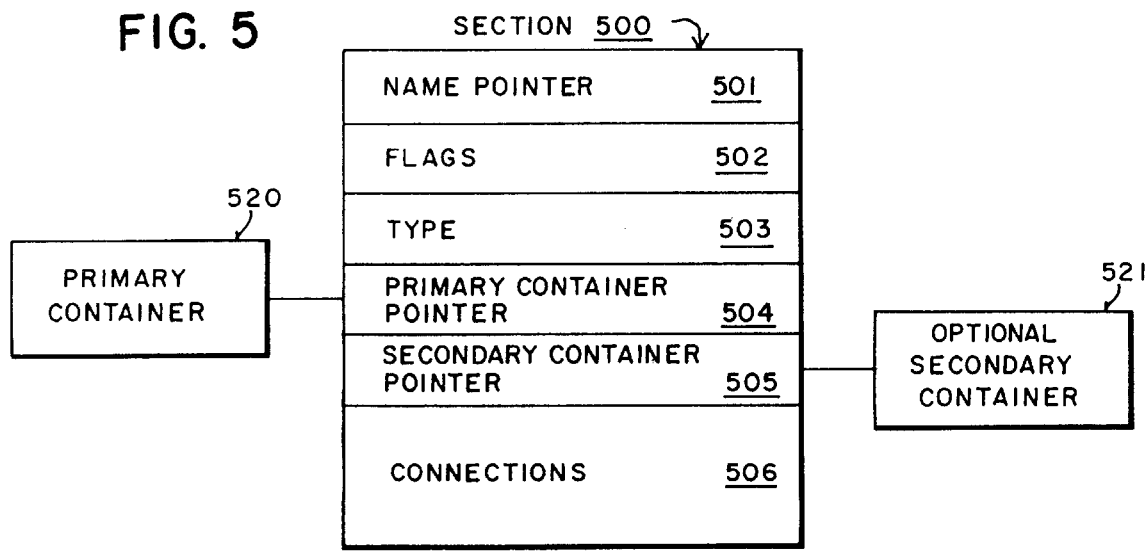

SYSTEM FOR ALLOCATING COMMON MEMORY IN CACHE SUCH THAT DATA IS MAINTAINED WHEN EXITING FIRST PROGRAMMING STRUCTURE AND ENTERING SECOND PROGRAMMING STRUCTURE

This is a continuation of application Ser. No. 07/954,902, filed Sep. 30, 1992 now abandoned.

FIELD OF THE INVENTION

The present invention relates to the field of processors in computer systems; particularly, the present invention relates to task execution in a processor.

BACKGROUND OF THE INVENTION

Modern applications, such as multimedia applications where text, audio, speech, video, and data communications are all processed in real-time, require special considerations. Typically, standard commercially available microcomputers do not have the requisite processing power to perform all the operations in a real-time environment. Many modern architectures designed to perform these types of operations in real-time include digital signal processors (DSPs). DSPs perform mathematical operations on digitized signals, wherein digital signals are digital representations of analog signals, such as sounds, images or speech. To correctly process such digitized signals, it is necessary to know the sample rate at which the signals are digitized and the format of the digital bits representing the analog signal. Using the sample rate and format, the digitized signal can be manipulated by application software programs and systems, known as clients. The resulting data can be stored or can be converted back into analog signals. The application software programs that utilize DSP processors are hereinafter referred to as a "host DSP applications" while the software code that is actually executed on a DSP is referred to as a DSP program. For example, a host DSP application may be a program to create and edit music, while a DSP program may be used for compressing, decompressing and mixing stored audio data or for recording and playing back such audio data. In some instances, host DSP applications are supported using dedicated hardware components, such as a modem or audio interface or a graphical display interface.

DSP applications are typically comprised of multiple operations performed on the signals (i.e., the data). The emphasis of these DSP applications is on the signal or data flow. As one operation is completed, the resulting data "flows" to the next operation so that it can be manipulated. The data flow in DSP applications is usually accomplished by storing the data in locations, i.e., buffers, after completion of an operation. The data is then read from the buffer, processed by the next operation, and stored into yet another buffer. Moving these buffers in memory to accommodate consecutive operation often requires a substantial percentage of the processing time. Furthermore, the buffers, and their associated memory space, are typically located off-chip in slower static random access memory (SRAM) or dynamic random access memory (DRAM). Thus, where several operations are involved, the data must be loaded on-chip, an operation performed, and then the resulting outgoing data must be stored off-chip. Then for the next operation the data would be loaded back on the chip, the next operation would be performed, and the data would be stored back off-chip. During the time the data is moved between buffer locations, the DSP is not performing any computational operation.

Thus, a significant percentage of the time involved in utilizing the DSP is in moving data on and off the chip so that the data may be processed. For some applications and DSPs, more than twenty-five percent of the functional time is spent waiting while data is loaded and unloaded on and off-chip between operations, depending on the system hardware.

By performing the load and store operations to move data on and off-chip, the prior art DSP programs typically permit the data flow to be controlled. The control of the data flow is inherent in the operations which comprise the program. Typically, in the prior art, the operations are programmed, such that the buffer locations are fixed in the source code. Therefore, in the prior art, the data flow is controlled by the DSP program operation and not the application software.

As will be seen, the present invention provides a set of connections and buffers between operations which minimize the amount of the data which has to be moved on and off the chip. Furthermore, the present invention provides a method and a means to allow a DSP processing program or the underlying operating system to control the data flow. In this manner, the application that installs the program controls the data flow.

SUMMARY OF THE INVENTION

It is object of the present invention to provide a connection scheme between processing modules which allows an application to build a processing network by making connections between the I/O buffers of different standard processing modules.

It is yet another object of the present invention to provide a standardized way to design a processing module such that it can be used in various configurations, depending on the directions from the application program.

It is still another object of the present invention to reduce processing overhead associated with the movement of buffers of data between processes.

These and other objects are provided for by a method and means for allocating memory for a multiple program structure. The present invention provides a method and means for specifying a connection between the programming structures. The present invention also includes a method and means for connecting the programming structures by pointing the input data location of one of the programming structures to the output data location of the preceding programming structure, such that the buffer location used for storing data output from one programming structure becomes the buffer location used to input data into the next programming structure.

It is also an object of the present invention to provide a mechanism for the sharing of a data stream among multiple tasks while eliminating the overhead associated with moving the data stream to and from each task.

It is another object of the present invention is to provide a mechanism for adding additional, temporary, local inter-task buffers in addition to already existing inter-task buffers.

These and other objects are provided for by a method and means for creating an inter-task buffer. The inter-task buffer is created by first adding a first task which opens the inter-task buffer. The inter-task buffer is completed by adding another task after the first task. This second task closes the inter-task buffer. Adding a task between the first and second task takes the output buffer list from the previous task as its input buffer list and takes the input buffer list of the following task as its output buffer list.

BRIEF DESCRIPTION OF DRAWINGS

The present invention will be understood more fully from the detailed description given below and from the accompanying drawings of the preferred embodiment of the invention, which however, should not be taken to limit the invention to the specific embodiment but are for explanation and understanding only.

FIG. 3 is a block diagram of the four layer memory model employed by the DSP operating system of the present invention.

FIG. 4 illustrates the organization of data associated with each module in a task.

FIG. 5 illustrates the currently preferred embodiment of a section in a module in the present invention.

DETAILED DESCRIPTION OF THE PREFERRED INVENTION

A method and means for allocating memory for multiple program data structures is described. In the following description, numerous specific details are set forth such as specific processing tasks, modules, data structures, etc., in order to provide a thorough understanding of the present invention. It will be obvious, however, to one skilled in the art that the present invention may be practiced without these specific details. In other instances, well-known signal processing steps have not been described in detail to avoid unnecessarily obscuring the present invention.

The Overview of a Computer System in the Preferred Embodiment

Figure 1:
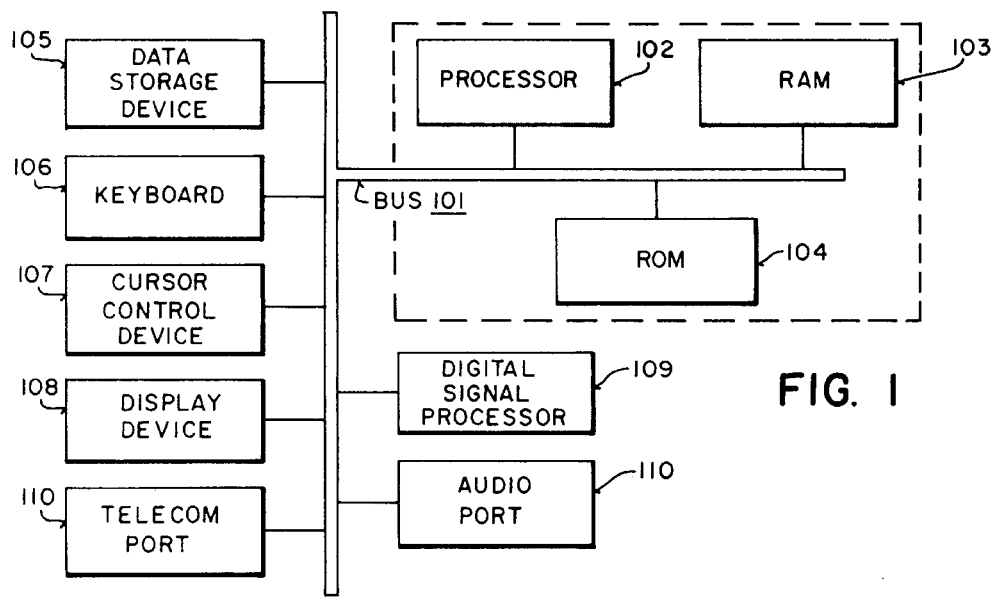
FIG. 1 is a block diagram of the computer system which may be utilized by the preferred embodiment of the present invention.

The preferred embodiment of the present invention may be practiced on computer systems having alternative configurations. FIG. 1 illustrates some of the basic components of such a computer system, but is not meant to be limiting nor to exclude other components or combinations of components. The computer system illustrated in FIG. 1 comprises a bus or other communication means 101 for communicating information, a processing means 102 (commonly referred to as a host processor) coupled with bus 101 for processing information, a random access memory (RAM) or other storage device 103 (commonly referred to as main memory) coupled with bus 101 for storing information and instructions for the processor 102, a read only memory (ROM) or other static storage device 104 coupled with the bus 101 for storing static information and instructions for the processor 102.

Other devices coupled to bus 101 include a data storage device 105, such as a magnetic disk and disk drive for storing information and instructions, an alpha numeric input device 106, including alpha numeric and other keys, for communicating information and command selections to processor 102, a cursor control device 107, such as a mouse, track-ball, cursor control keys, etc., for controlling a cursor and communicating information and command selections to the processor 102, a display device 108 for displaying data input and output, a digital signal processor (DSP) or other high speed processor 109 for processing DSP resource requests, an audio port 110 for input and output of audio signals and a telecommunications port 111 for input and output of telecommunication signals. In such a computer system configuration, the digital signal processor 109 is considered a coprocessor to the host processor 102.

Architecturally, a DSP is a very fast integer Reduced Instruction Set Computer (RISC) based general purpose microprocessor which includes a pipelined arithmatic processing unit. A fundamental difference from true general purpose processors is that a DSP is designed to perform a multiply and accumulate (MAC) operation very quickly. The MAC operation is heavily used in DSP programs. It should be noted that DSP host applications may be written that do not require DSP coprocessor for execution, but would exploit them if available. An embodiment of the present invention is implemented for use on some of the members of the family of Macintosh™ brand of computers, available from Apple Computer, Inc. of Cupertino, Calif. A coprocessor that may be utilized is any digital signal processor having operating characteristics and functions similar to those found in DSP 3210 Digital Signal Processor, available from American Telephone and Telegraph (AT&T) Microelectronics of Allentown, Pa.

Operating System Organization

Figure 2:
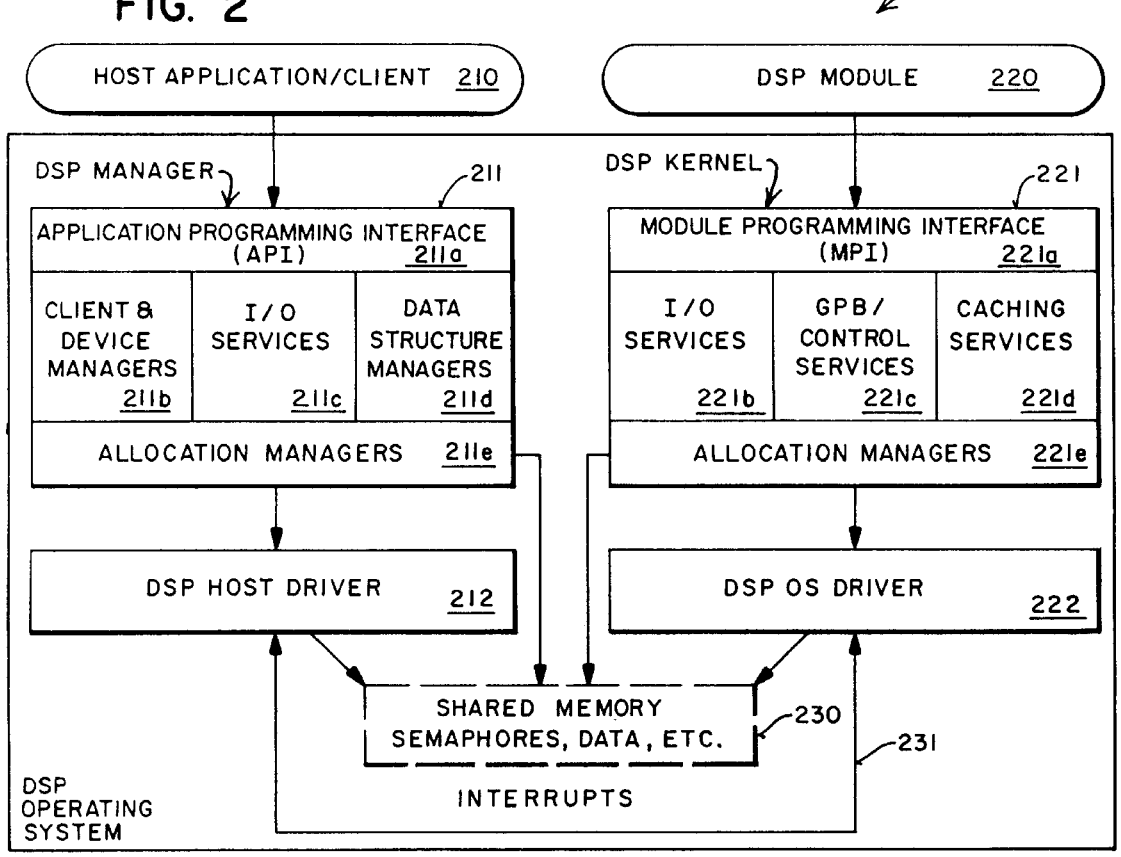
FIG. 2 illustrates the structure of an operating system which is used for managing tasks and clients using a coprocessor such as a DSP.

The operating system organization of this embodiment is separated into two distinct halves for the two processors operating in the computer system. Referring to FIG. 2, host applications/clients 210 are handled by a DSP Manager 211 which operates in the host processor to direct and spawn tasks which are to be run in the DSP. In contrast, DSP modules or tasks 220 (which are spawned by DSP Manager 211 in the host processor) are operated from within a DSP Kernel 221. In short, there are two distinct levels of computer programs which are used for operation in the preferred embodiment:

(1) Client (application or higher level toolbox) software programs which are executed on the host processor; and (2) DSP programs known as "modules" which run in DSP 109 (FIG. 1).

Therefore, programs may be written for DSP 109 and host 102 separately. For instance, library routines may be generated for operation in DSP 109, and those routines may be available to host-client programmers for reference during execution. Interprocess communication between DSP Manager 211 in host processor 102 and the DSP is provided by the DSP Kernel operating in DSP 109 (FIG. 1) and is provided through shared memory 230. Shared memory space 230 may be coupled to bus 101 or reside in main memory 103.

Shared memory 230 contains semaphores, data, messages, and other information which are required for interprocess communication between the two processors 102 and 109. DSP Manager 221 is further coupled to a host driver 212 which provides various hardware implementation dependent functionality for the DSP Manager 211 and other client management functions which may be directed to the DSP Kernel driver 222. Therefore, toolbox routines may be available to the application/client program 210 to direct various actions in the tools residing in the DSP Kernel driver 222. Interprocessor communications are provided through shared memory area 230, as well as by interrupt lines 231, which are activated when actions need to be taken by either DSP host driver 212 or DSP Kernel driver 222. It should be noted that the structure shown in FIG. 2 is not required for practicing the present invention and is set forth for illustration purposes only. It can be appreciated by one skilled in the art that many other structures of operating systems to provide interprocess communication may be used.

The DSP Manager 211 is available to the host application/client routines 210 through an interface known as the application programming interface (API). In the currently preferred embodiment, DSP Manager 211 performs three primary services which are accessible through the API. These three services are known as the client and device manager routines 211B, I/O services 211C, and data structure managers 211D. These various services make calls on Allocation Managers 211E at the lowest levels of the DSP Manager 211. The DSP Kernel 221 is similarly structured to DSP Manager in that it includes a Module Program Interface (MPI) 221A which is accessible by the DSP modules 220 generated by DSP programmers. MPI 221A accesses services available to the DSP modules such as I/O services 221B, guaranteed processing bandwidth (GPB) and control services 221C, and caching services 221D. Underlying these functions is an executive layer 221E which is responsible for managing task sequence and frame handling functions. These Kernel routines have access to the DSP Kernel driver 222 and, thus, have access to the shared memory areas 230, and interrupt lines 231. In addition, executive layers 221E also has access to the shared memory area 230 for communication of messages to and from the DSP Manager 211 residing in the host processor.

The DSP Memory Model

In order to support the execution of DSP programs, the DSP utilizes a layered memory model as shown in FIG. 3. Referring to FIG. 3, DSP processor core 301 is coupled to high speed cache 302 by ultra high speed bus 303. Bus 303 is an ultra high speed bus used to transfer data and instructions between core 301 and cache 302. In the currently preferred embodiment, cache 302 is an 8 kilobyte high speed cache located on the DSP chip itself. Cache 302 is coupled to local memory 304 with bus 305. Bus 305 is a high speed bus, slower than bus 303. Local memory 304 supports the caching function of loading program code and data into and saving data from cache 302. Local memory 304 also contains the data structures that the DSP (FIG. 1) needs to determine the order of operation for the DSP and includes program code modules and data buffers. Local memory 304 can be implemented as either physical memory which is separate from the host memory, or allocated as a block of the host memory. In the currently preferred embodiment, local memory 304 is implemented as physical memory separate from the host memory for expansion cards. Otherwise, linked blocks of host memory are allocated as local memory.

Local memory 304 is divided into two areas: DSP-only local memory and "shared" local memory. The division in local memory 304 enables the DSP operating system to automatically store DSP-only data structures on-chip so that caching during each execution cycle is not required. This is primarily for future enhancements, when the cache size becomes larger.

Local memory 304 is coupled to main (host) memory 306 with bus 307. Bus 307 is a low speed in comparison to bus 303 and bus 305. In this case, speed refers to required transfer rate, rather than actual bus operational speed. Main memory 306 supports data streams into and out of first-in/first-out (FIFO) buffers. Main memory 306 is supported by on-line storage 308. On-line storage is never accessed directly by the DSP. It is the responsibility of the host application to move data between main memory 306 and on-line storage memory 308.

When local memory is allocated as part of main memory, the data transfer rate of the high-speed bus 305 must be supported by the main memory.

Data Structures Used in the Preferred Embodiment

The data structures utilized by the currently preferred embodiment of the present invention are referred to as "modules" and "tasks." A module is a data structure defined by the system and the DSP programmer which is created to perform a predetermined function. A DSP module always includes program code, but it may also include data, input and output buffers, and parameter blocks. The number of modules and their required resources are defined by the DSP programmer.

A task is a data structure containing a reference to a list of one or more modules. Thus, a DSP task comprises one or more DSP modules. The modules in a task are grouped in the appropriate order and with the appropriate input/output and buffer connections. Frequently, a DSP task contains only one DSP module. Tasks may be grouped together in order to perform a specific function. The group of sequentially ordered tasks is known as a task list. In essence, a task list is a data structure which references a series of executable modules (i.e., programs). A task is activated or deactivated as a single unit. Also, a set of tasks can be sequentially or simultaneously activated or deactivated. A task is installed and removed from the task list as a unit.

DSP modules are provided to an application programmer as a resource and loaded into a DSP task using DSP Manager 211. A task is constructed using a series of calls to DSP Manager 211. These calls create the task structure, load and connect modules in the desired arrangement, allocate the required memory, and install the completed task into a DSP task list. Each of the modules comprises a DSP module header containing pointer information and other information related to the data structure and a series of DSP sections which each point to various resources, includes executable code required by the DSP module to perform its function.

The currently preferred embodiment of the DSP module is shown in FIG. 4. The internal structure of module 400 includes both code and data. Each module comprises a header and one or more sections. Header 401 contains information about the entire module such as its name, execution time information, and control flags. Header 401 also includes a count of the number of sections in the module. This allows module 400 to be of variable length, and the number of sections to be varied.

Module 400 shows sections 402–405. Sections allow modules to be created for a wide variety of functions. In the currently preferred embodiment, each section has a name pointer, flags, and a data type fields. In addition, each section contains pointers to up to two separate containers. Containers hold the data or code corresponding to the section. The sections can point to code, data tables, variables, buffers, parameters, work space, or any other resource needed to provide the desired function.

A section does not contain the actual code or data used by the DSP. Instead, a section is a data structure that contains pointers to the code or data block. The operating system of the DSP uses the section structure and flags to cache the actual code or data block into high speed cache memory during execution of the module. Referring to FIG. 5, section 500 comprises name pointer 501, flags 502, type 503, primary container pointer 504, secondary container pointer 505 and connections 506. Name pointer 501 points to a character string which identifies the section of a module. Flags 502 and type 503 are used by the preferred embodiment to control caching and manage buffers. Connections 506 is data that is used for buffer management internally to the DSP Manager and is discussed below.

Primary container pointer 504 points to the primary container 520, while secondary container pointer 505 points to the secondary container 521. In the currently preferred embodiment, primary container 520 and secondary container 521 are buffers. The DSP uses these pointers whenever it wants to locate the section data. Every section is normally required to have a primary container pointer 504, which can point to locations either on or off-chip. The secondary container pointer 505 is optional. If a section has a secondary container pointer 505, then the primary container pointer 504 points to where the DSP program code will access the section and the secondary container pointer 505 points to where DSP operating system keeps the data between executions of the modules. Primary container 520 is allocated in local memory if it contains fixed data or parameters for communication between the host application and the module. Otherwise, primary container 520 is located in high speed cache (on-chip static RAM [SRAM] in the preferred embodiment) to increase execution performance. The secondary container 521 is usually allocated in local memory, but in special cases can be allocated in the cache. Allocated memory for each container must be in either local or cache memory.

To execute modules, each module is cached for access and execution by the DSP. The currently preferred embodiment of the present invention supports two separate execution models: AutoCache and DemandCache. In AutoCache, the programmer specifies which code and data blocks are to be loaded and saved. The DSP Kernel performs all load and save functions automatically. In DemandCache, the programmer explicitly moves code and data blocks on and off-chip, whenever needed, by making the appropriate calls to the DSP Kernel MPI in the module DSP code.

During precaching of an AutoCache module, code and data are loaded into the cache according to the section flags prior to its execution. During postcaching (after module execution is completed), data is saved back to local memory. During precaching, the data is moved from secondary container 521 to primary container 520. In the currently preferred embodiment, this usually entails moving the contents from local memory to cache memory prior to module execution. This is commonly known as a cache load. After module execution (postcaching), the DSP moves data from the primary container 520 to secondary container 521. In the currently preferred embodiment, this entails moving the contents from cache memory to the local memory. This is commonly known as a cache save. When caching is not required, only one container is needed, the primary container 520. The use of containers supports communications between modules and the host application. This is usually through a shared memory area which either resides in host memory (FIG. 1), or otherwise, is connected to the bus (FIG. 1).

The use of sections as disclosed herein provides unique capabilities wherein multiple modules, either provided off the shelf or written by a DSP programmer, may be modularized in such a way as to be joined together in a multiplicity of combinations. Application programmers may thereby create their own program without addressing the underlying functionality of DSP-specific modules. In addition, a variety of hardware platforms may be implemented with the section model providing compatibility with current platforms and future hardware advances.

Figure 6:
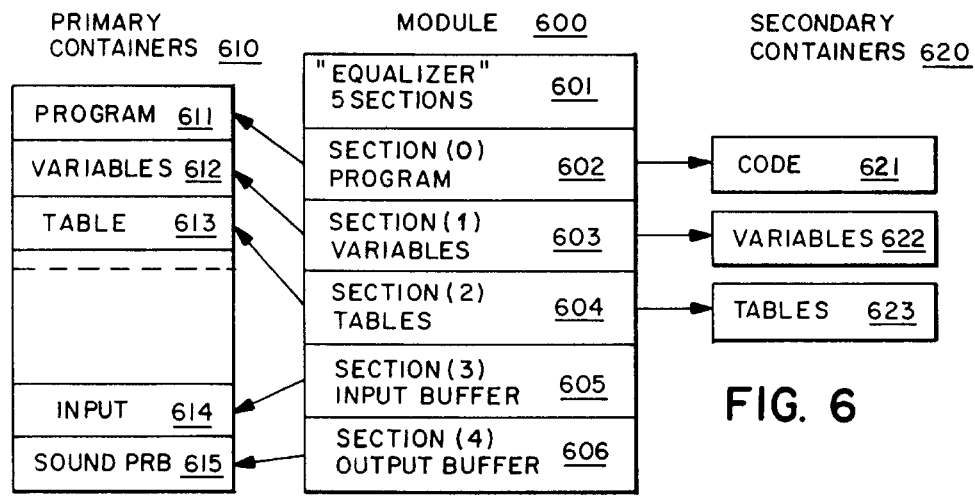
FIG. 6 illustrates an example of various resource references associated with a module of the present invention.

An example module with its primary and secondary containers is shown in FIG. 6. Module 600 is entitled "Equalizer" and contains five sections as indicated by field 601. Module 600 has program, variables and table sections 602, 603, and 604 pointing to primary containers 610 in the cache containing program information 611, variable information 612, and table information 613. In addition, module 600 has an input and output buffer pointed to by 605 and 606 which point to input buffer 614 and sound output buffer 615. A caching function provided by the system in the preferred embodiment moves information between the secondary and primary containers prior to module execution and moves data between the primary and secondary containers after module execution. The secondary containers 620 includes code 621, variables 622, and tables 623. Module and secondary containers are located in local RAM, and primary containers are located in the cache. In the example shown, code, variables, and table sections are loaded into the cache prior to executing the code section provided by module 600. After execution completes, only the variables are saved back to local memory. It is not necessary to move the code and table back, since they contain static data.

To execute module 600, memory must be allocated. The allocation and memory management is accomplished in two phases. When the client loads module 600 into system memory from a resource file, the DSP Manager allocates all the required blocks in local memory to hold the structures. For module 600, the DSP Manager allocates memory space for the module itself and the three secondary containers 621, 622 and 623. Containers 621, 622 and 623 are then loaded with data from the resource file to complete the first phase.

The client must also specify the I/O connections for module 600. The specifying of I/O connections is discussed below. Besides specifying I/O connections, other modules may be loaded and connected together to form a multi-module task. Once completed, the DSP Manager calls one of the Allocation Managers to perform the cache allocation. The specified connections are built such that the buffer locations in cache memory eliminates as much buffer movement as possible, making sure the allocation is compact enough to fit the required on-chip sections for each module in the cache. If a buffer can be set and left in one place without being moved between execution of modules or tasks, the overhead for maintaining the buffer is reduced. Cache allocation by the Allocation Managers is the second phase of allocation. Once cache memory has been allocated to the task, it is ready for installation. For DemandCache, additional allocation is performed by the DSP Kernel at run-time.

The Overall Structure of Tasks

Figure 7:
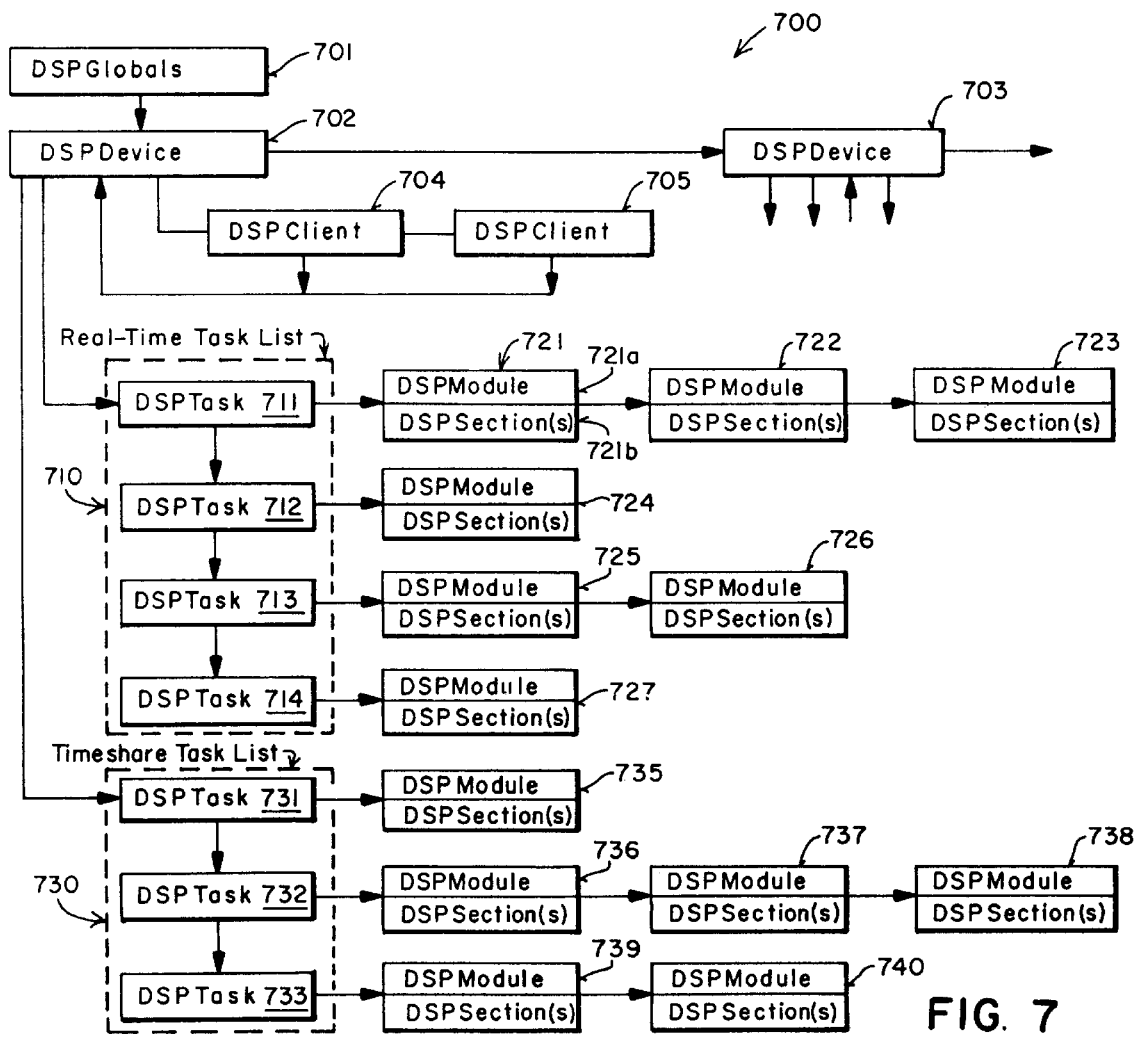
FIG. 7 illustrates the organization of tasks into task lists which may be performed by a DSP.

The overall structure of tasks to be executed in the preferred embodiment is shown with reference to structure 700 of FIG. 7. The system comprises a set of DSP globals 701 which maintains control and information regarding each of the DSP devices, such as 702 and 703, coupled in the system. Each DSP device, such as 702 and 703, may be one as shown as DSP in FIG. 1. In this multiprocessing environment, a plurality of DSP devices may be used for certain tasks and/or capabilities in the system. Each of the DSP devices may be coupled to a bus (FIG. 1) and reside on the main system logic board, or be coupled to the bus as expansion devices in the computer system. The detailed structure of only one DSP device 702 is shown for simplicity, however, DSP device 703 and subsequent devices coupled on a bus (FIG. 1) may have a similar structure.

A DSP device, such as 702, handles a plurality of DSP clients, such as 704 and 705, wherein the client is either a high-level system toolbox or an application that wishes to use a DSP (FIG. 1). A DSP client is activated by "signing in" the client using a system call made through the DSP Manager (FIG. 2). Client and device managers (FIG. 2) are used to manage clients using DSP device 702. In this manner, each DSP device maintains information about the client as it relates to tasks that the client requires.

Each DSP device, such as 702, maintains two independent task lists 710 and 730 which are used for keeping track of tasks currently running in the DSP operating system. One task list 710 is known as the "real-time" task list and is a set of routines which need to be operated upon at regular intervals. Each task, such as 711 through 714, in the real-time task list is executed only once during regular intervals so that the client requiring the services of each DSP task in the DSP task list 710 is serviced within a specific interval of time. A technique known as guaranteed processing bandwidth (GPB) is utilized to ensure that the tasks in real-time task list 710 do not exceed the maximum length of time in which real-time tasks may be executed. DSP Manager (FIG. 2), through the client and device managers (FIG. 2), ensures that an excessive number of real-time tasks not be inserted into real-time task list 710. Additionally, services are provided by the DSP Operating System to handle cases where maximum real-time is exceeded (frame overruns) due to programming errors or other system problems.

Real-time task list 710 links all the real-time tasks 711 through 714 which need to be performed within the DSP in a specified interval of time known as a real-time frame. Each of the "tasks" 711 through 714 is actually a datum in a data structure which references the next datum in the task list. Therefore, DSP Kernel (FIG. 2) scans the real-time task list during each real-time frame and executes each task 711 through 714 once in order as indicated by the arrows shown in FIG. 7. When the end of the real-time task list is reached, for instance, at DSP task 714, then real-time task execution halts. Each of the DSP tasks 711 through 714 is actually a datum in a data structure which references certain DSP modules such as 721, 724, 725, and 727. The second field, known as the DSP section(s) fields 721*b*, is used for referencing all the resources required by the executable module which is referenced by first field 721*a*.

In addition to real-time task list 710, the DSP device maintains a second task list known as timeshare task list 730. Timeshare task list 730 maintains a similar list of elements in a data structure, such as 731 through 733, each of which references so-called "timeshare" tasks or tasks that do not need to be executed at regular time intervals. Each of the elements 731 through 733 in the timeshare task list references "modules", such as 735, 736, and 739 which all contain references to executable code and resources required by each of the modules. This is a similar structure to that set forth in the real-time task list described above. The timeshare task list is executed "round robin" whenever the real-time task list is not executing.

Data I/O Buffering

Referring back to FIG. 6, input and output buffers may be specified for each module. By connecting the input and/or output buffers of several modules within or between tasks, the present invention controls the data flow. Generally, to accomplish these connections, a module must specify the number and format of its buffers. For example, whether the buffers are input or output (or both) need to be specified, as well as whether the buffers are floating point or integer buffers, etc. Buffers are connected to similar buffers in other, separately designated, modules. These connections are made by routines in the DSP Manager (FIG. 2) under the direction of the host application program. In the currently preferred embodiment, the DSP Manager attempts to connect these buffers in an efficient manner to minimize the loss of DSP time used in moving buffers around (i.e., moving buffers off and on chip and moving buffers around on chip). In the currently preferred embodiment, the buffers utilized by the present invention to buffer the data between processes and processors are either First-In/First-Out (FIFO), Half-In/Half-Out (HIHO) or All-In/All-Out (AIAO) buffers.

FIFO buffers are asynchronous buffers. For the present invention, the size of a FIFO typically ranges from 20 Kbytes to 400 Kbytes to buffer data depending on the data rate and the maximum latency of the serving process. However, it should be noted that the size of FIFO's in the present invention can be any size. In the currently preferred embodiment, FIFOs are used as buffers between the host application and the DSP system for music, speech, and sound effect data.

FIFOs are also used to buffer output from the DSP to the host application and to handle non-frame synchronous data. For example, if data is produced at a rate of 22,254.54 samples per second, the amount of data per frame is either 222 or 223 samples (at 100 frames per second). Using a FIFO allows the processes that are filling and emptying the buffer to read and write exactly the amount of data they require.

FIFOs have status associated with them, and can be in various states. For example, a FIFO can go empty or full, can fill above a preset amount or be emptied to below a preset amount, or it can be overrun or underrun. When the FIFO empties below the preset amount, or fills above the preset amount, the DSP Kernel, which handles the FIFO for the DSP module, can send a message to the host application, which can then refill the FIFO, usually from the disk, or empty the FIFO, usually to the disk. A FIFO is overrun when there is an attempt to put more data into the FIFO then it can contain. This happens if the data consumer cannot keep up with the data producer. Underrun occurs when the consumer is not able to read as much data from the FIFO as it needs to produce one frame's worth of data. The I/O routines of the DSP Kernel automatically fill the remaining unavailable data with zeros. It is important to make the FIFO large enough to prevent FIFO overruns or underruns from occurring or provide a mechanism in the application to halt data production. In the currently preferred embodiment, large FIFOs are usually placed in main host memory, because the local memory is usually more limited, and the average data rate is usually small. Small FIFOs can be located in the DSP local memory.

Figure 8:
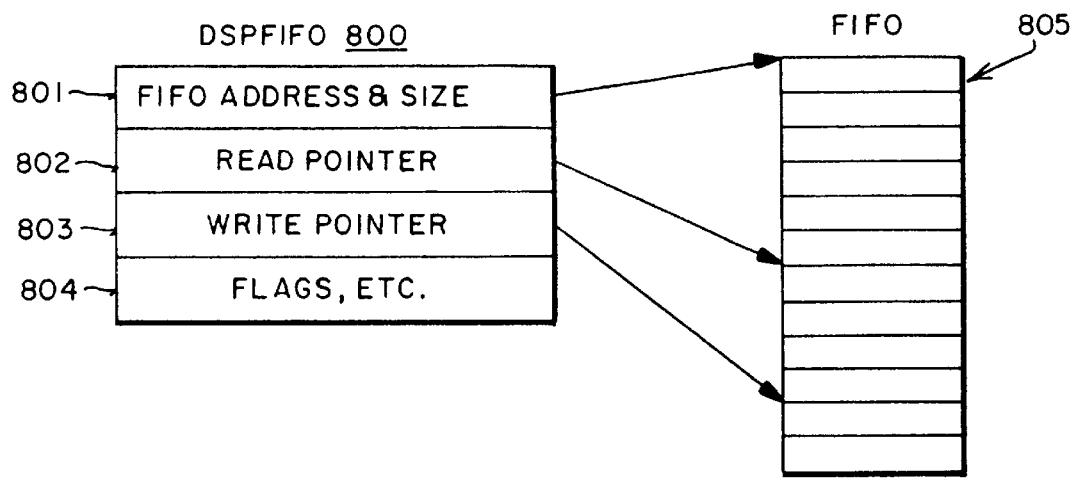
FIG. 8 illustrates the structure of the first-in/first-out buffers utilized by the present invention.

FIFOs are accessed by making read and write calls to the DSP Kernel. The DSP Kernel is responsible for handling status conditions, such as empty or full, below or above preset level, and overrun or underrun. The DSP Kernel is also responsible for updating FIFO pointers and sending messages to the client as required. In the currently preferred embodiment, the messages indicate one of the following: that the FIFO goes below preset (when the DSP is reading from the FIFO), the FIFO goes above preset (when the DSP is writing to the FIFO), the FIFO is full or empty, and the FIFO has underflowed or overflowed. The preset value is often set to the half-full value, so the below and above preset status is the same as "half empty" or "half full" status. Another message is "FIFO has gone not empty," which indicates that a consumer task should wake up. Additionally, FIFO empty messages can be used to deactivate consumer tasks. Messages are optional. The host application programmer selects which messages are desired when setting up the FIFO via calls to the DSP Manager. In order for the DSP Kernel to manage handling status conditions, the currently preferred embodiment of the FIFOs of the present invention have a header block called DSPFIFO. The structure of the DSPFIFO is shown in FIG. 8. Referring to FIG. 8, the DSPFIFO is shown divided into a series of blocks. In the currently preferred embodiment, DSPFIFO structure 800 comprises four blocks: FIFO address and size 801, read pointer 802, write pointer 803, and flags 804. FIFO address and size 801 indicate the starting address in memory for the FIFO buffer 805 and the size of the FIFO buffer 805. Read pointer 802 indicates the location in the FIFO at which the last read operation occurred. Write pointer 803 indicates the last location in the FIFO where a write operation occurred. The pointers move in response to reads and writes of data to the FIFO.

The FIFO requires two separate blocks of memory, one for the DSPFIFO structure 800 and one for the FIFO buffer 805 itself. In the currently preferred embodiment, the DSPFIFO structure is located in local memory and the FIFO buffer is located either in local memory or main memory, depending on its size. When a FIFO is connected to a I/O buffer section, the section structure contains a set of FIFO flags and a pointer to the DSPFIFO structure.

While the FIFO is ideal for many buffering operations, it requires the DSP Kernel to manage the DSPFIFO structure and its flags and pointers and also requires dual data movements (i.e., reads and writes to the FIFO). This requires significant additional processing and bus overhead and should be avoided whenever possible. A second buffer type employed by the present invention, the All-In/All-Out (AIAO) buffer, does not have such requirements. AIAO buffers transfer data between one module and another during a given frame. Thus, the AIAO buffer is transient and acts like a data bucket between modules: the first module fills the buffer, and the following module empties it. In the currently preferred embodiment, the AIAO buffers fill and empty one frame of data at a time. Thus, the AIAO buffers are frame-synchronous buffers containing only one frame of data. No management overhead is required at run-time for AIAO buffers.

In the currently preferred embodiment, the AIAO buffers do not contain a header block as in the FIFO. The AIAO buffer uses the standard section structure and does not have to be moved. Thus, an AIAO buffer may remain in the same place during the execution of several modules within a task. In this manner, an AIAO buffer may be used by multiple modules during execution of multiple tasks. In effect, this multi-use of an AIAO buffer connects the data stream inputs and/or outputs from one module to the input and/or output data streams of another module, thereby soft wiring the modules together in a processing network. These connections are made between modules by appropriate calls to the DSP Manager (FIG. 2) when a task is being built. AIAO buffers can also be used to pass data between modules in different tasks. This is referred to as an inter-task buffer (ITB). These are handled in a very similar way, but additional calls are necessary to support them. Furthermore, an ITB requires setting aside DSP on-chip memory to pass the data between tasks. ITBs are discussed later.

There are instances where a given DSP module's input and output buffers can be connected to either an AIAO buffer or a FIFO buffer depending on its intended use. For a module with one input and one output AIAO buffer, there are four possible cases: FIFO to FIFO, AIAO to AIAO, FIFO to AIAO and AIAO to FIFO.

In the FIFO to FIFO case, the one input buffer (an AIAO buffer) to the module is fed from a FIFO, such as a music or speech FIFO. Similarly, the output buffer of the module (an AIAO buffer) is fed into a FIFO, such as a speaker FIFO. In this manner a FIFO to FIFO buffer connection can be made. It should be noted that the FIFO would be from another module or from another processor (e.g., the host). An AIAO to AIAO buffer connection is made by feeding the output buffer from one module into the input buffer of a second module, while feeding the input buffer of a third module from the output buffer of the second module. In this manner, an AIAO to AIAO buffer connection is made. It should be noted that the AIAO can be an intertask buffer, an AIAO buffer from a previous module within the same task, or an off-chip AIAO buffer. In the FIFO to AIAO connection case, the input buffer to the module is fed from a FIFO, while the output buffer of the module feeds an AIAO buffer. Likewise, in the case of an AIAO to FIFO connection, the input buffer to the module is fed from an AIAO, while the output buffer of the module feeds a FIFO. Once again, the data destination and source AIAO buffers could be intertask buffers, an AIAO from a subsequent or previous module within the same task, or an off-chip AIAO, and the FIFO could be from or to another module or processor (e.g., the host processor). AIAO buffers can also be connected to Half-In/Half-Out (HIHO) buffers as discussed below.

The present invention provides a mechanism for allowing either a FIFO or AIAO buffer to connect to an AIAO input or output buffer. The Connection Manager of the present invention is capable of handling this function automatically. A FIFO is connected to an AIAO section by converting the AIAO secondary container function to a FIFO access. In order to connect a FIFO to AIAO input and output buffers, the DSPFIFO data structure is attached to the AIAO section and flags are set to indicate its function.

The direction of the data flow for a AIAO/FIFO connection must be specified. If the AIAO is an input buffer, data flows from the FIFO to the AIAO, and the FIFO LOAD flag is set by the Connection Manager to indicate the FIFO operation. The AIAO section LOAD flag must already be set, but in this case the DSP Kernel loads from the FIFO rather than directly from an off-chip secondary buffer when the cache load occurs.

If the AIAO is an output buffer, the data flows from the AIAO to the FIFO. The SAVE flag must already be set, and the FIFO SAVE flag is set by the Connection Manager to indicate the FIFO operation. This tells the Kernel to save to the FIFO during cache saves rather than to an off-chip secondary buffer.

The important aspect of this operation is that the connection to a FIFO is accomplished strictly under the direction of the host program, depending on the requirements of the processing network needed to support the host application. The DSP module itself has no knowledge of the source or destination of its data—this is handled by the I/O services and caching functions of the DSP Kernel. This allows generic modules to be reused in different configurations.

A third type of buffer supported is the HIHO (Half-In/ Half-Out) buffer. This type of buffer is used to pass synchronous data between two different processors or processes. Note that the two processes must be synchronous i.e., being running at the same frame rate. The HIHO buffer is an extension of the AIAO buffer, where the intermediate buffer is always in external memory and is twice as large as the AIAO buffer it connects to—i.e., it contains two frames of data.

A consumer process connected to a HIHO buffer reads first from the bottom half of the buffer. On the next frame, it reads from the top half of the buffer. This alteration continues in real-time. The producer process does the same thing, but must begin exactly one frame earlier. Thus, mechanism for synchronizing the start up of the producer and consumer is required. Otherwise, a FIFO must be used, with much higher overhead.

HIHOs are used between the sound input DMA and the sound input task. Likewise, a HIHO is used between the sound output task and the speaker output DMA. On frame n, the DMA is filling or emptying the bottom half of the buffer, and the sound tasks are loading from and saving to the top half of the buffers. On frame n+1, the opposite is true. Again, this alternates every frame.

A mechanism must be provided to allow AIAO loads and saves from and to HIHO's to work correctly. This is done in the preferred embodiment by setting a HIHO flag in the module header, and using two section tables. The DSP Kernel is responsible for alternating the section table used each frame. The DSP Manager is responsible for loading the proper addresses in the section tables, and for correctly setting up the synchronized start-up process. In particular, the DSP Manager sets up the HIHO base address in one section table, and sets up the base address plus the one half the HIHO size in the other section table. This gives the effect of using alternate halves of the section table every frame. Thus, the overhead per frame is extremely small for the DSP Kernel, and HIHOs look exactly like off-chip AIAOs to the modules they are connected to.

Note that HIHO buffers also may be connected transparently to AIAO buffers, just like FIFO buffers. This again allows very complex custom networks across multiple DSP processors to be constructed without changing the module programming.

Buffer Connections Between Modules

Using AIAO buffers enables connections to be made between modules, such that data does not have to be moved. To implement an output buffer for a module, the buffer primary pointer in the section in the module references a particular area in memory, including its size. When the module is cached for execution by the DSP, the output data is written to the buffer at the cache location assigned by the Allocation Manager. By allowing the next module to use the same output buffer as its input buffer, the output data from the previous module is not saved back to the secondary buffer and is not loaded into a different location for the next module. Thus, the data remains in the cache memory (FIG. 3) and becomes the input data for the subsequent module. By having the input buffer primary pointer for the next module reference the same area in memory, two data moves are eliminated.

The interconnection of on-chip AIAO buffers is accomplished by a call to the DSP Manager. In effect, this call sets the section pointers for both AIAOs to the same primary container in the cache memory. This signals the DSP Manager to reserve the memory space and not to move the data off-chip between execution of modules. By preventing the movement of data off-chip, the input data is directly available to the next module. The next module can access the data as many times as it needs to in the high-speed cache without a memory access speed penalty. This is often required for certain algorithms such as filters algorithms (e.g., a rate converter).

The currently preferred embodiment utilizes two special types of AIAO buffers: the partial result buffer (PRB) and the complete result buffer (CRB). A PRB is an AIAO buffer that acts as an input and output buffer for a module, such that the contents of the PRB are summed into (rather than being stored into), thereby providing a mixer function. In this manner, the PRB accumulates data based on its previous contents. A complete result buffer (CRB) differs from a PRB in that it is written over rather than summed into. If a module uses a CRB as its output buffer, the resulting output data is stored into the CRB, thereby eliminating the previous data. The buffer type (PRB or CRB) is indicated by section flags. Other types of buffers can be specified by different combinations of the flags, as needed.

The PRB and CRB AIAO buffers are very beneficial. Since the on-chip PRB can be directly accessed and is in the high-speed cache, it can be read, the data representing the signal can be added to, and new results can written back with very little or zero processing impact, depending on the instruction set of the DSP. This eliminates the need to supply a separate mixer module or task to mix the new results into the data stream. The mixing function becomes part of the output architecture for the module. This particular use of AIAO buffers is specifically applicable to sound functions (i.e., sound modules), and may also be applicable to other functions.

Generally, AIAO buffers are not required to have summing outputs, nor that they be of any particular data format. However, in the currently preferred embodiment, if an AIAO buffer is to be connected to the AIAO of another module, the size and data type must match. Clearly, the method of using the AIAO buffers relies on connections made between the AIAO sections of modules. This process is handled by the DSP Manager under the direction of the client. In particular, the client specifies what connections are to be made with calls to the Connection Manager. Once all the connections are completed, the Allocation Manager places each section in the cache in an appropriate location that insures the best use of available resources.

If it is not possible to use an existing buffer location in the cache, due to disparity in the memory requirements for the modules, the present invention attempts to move the buffer within the cache between module execution (single high speed move). If it is not possible to move the buffer within the cache, the buffers are temporarily moved into local memory—a dual, lower speed move (FIG. 3). An example of this is given later in this document. In sum, the connection mechanism allows the creation of generic modules which can be connected in various configurations, depending on a function desired by the client. In this way, it is quite possible to create new functions by connecting together several modules in ways that were not envisioned by the module writers.

Buffer Connections Between Tasks

A task can be inserted into the task list to create a structure wherein multiple tasks are executed consecutively. AIAO buffers can be shared by the present invention by consecutive tasks. These shared buffers are referred to as inter-task buffers (ITBs). These ITBs can be used to pass data between the tasks without going off-chip for the data. Specifically, an ITB is a buffer which connects the output of one task into the input of one or more subsequent tasks. Each task uses pointers to reference both input ITBs (corresponding to ITBs used as input buffers by a task) and output ITBs (corresponding to ITBs used as output buffers by a task). The list of pointers which reference input ITBs for a task is referred to as an ITB in-list, while the list of pointers which reference the output ITBs for a task is referred to as an ITB out-list.

When the task is installed by the DSP Manager (FIG. 2), the DSP Manager automatically connects the task to any existing ITBs.

Figure 9A:
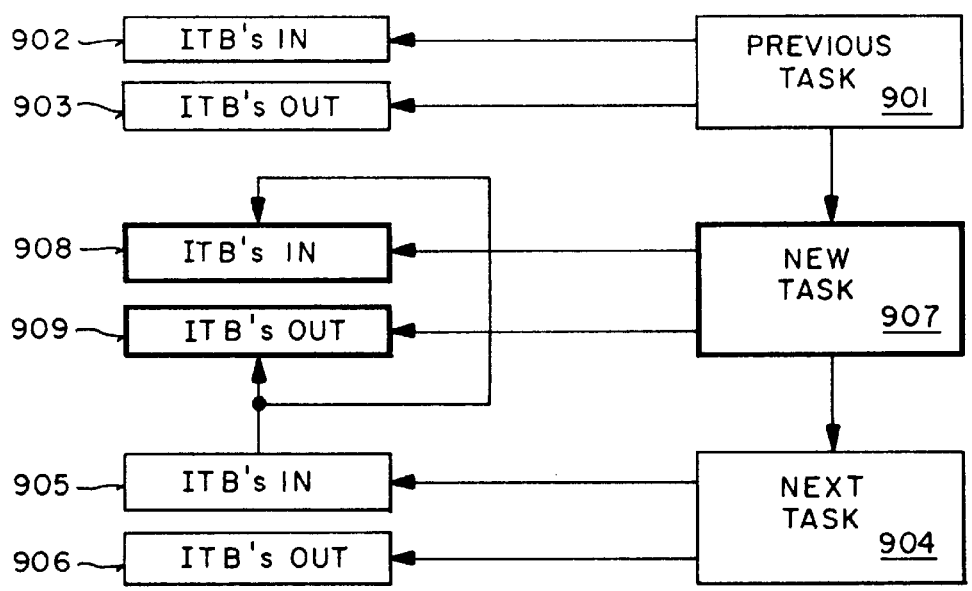
FIGS. 9A and 9B illustrate the assignments of input and output inter-task buffer lists of the present invention for a newly inserted task.

The manner in which the DSP Manager connects the task ITBs is dependent on whether the task is installed before or after an existing task in a task list. If a task is installed before another task (pre-insert), the incoming ITB list for the following task becomes the incoming and outgoing ITB list for the new task. A diagram of this is shown in FIG. 9A. Referring to FIG. 9A, task 901 has ITB in-list 902 and ITB out-list 903 and next task 904 has an ITB in-list 905 and ITB out-list 906. The new task 907 is added prior to task 904 and it has an ITB in-list 908 and ITB out-list 909. ITB in-list 908 and ITB out-list 909 is identical to the ITB in-list 905 of next task 904. In effect, a pre-insert extends backwards the ITB list.

Figure 9B:
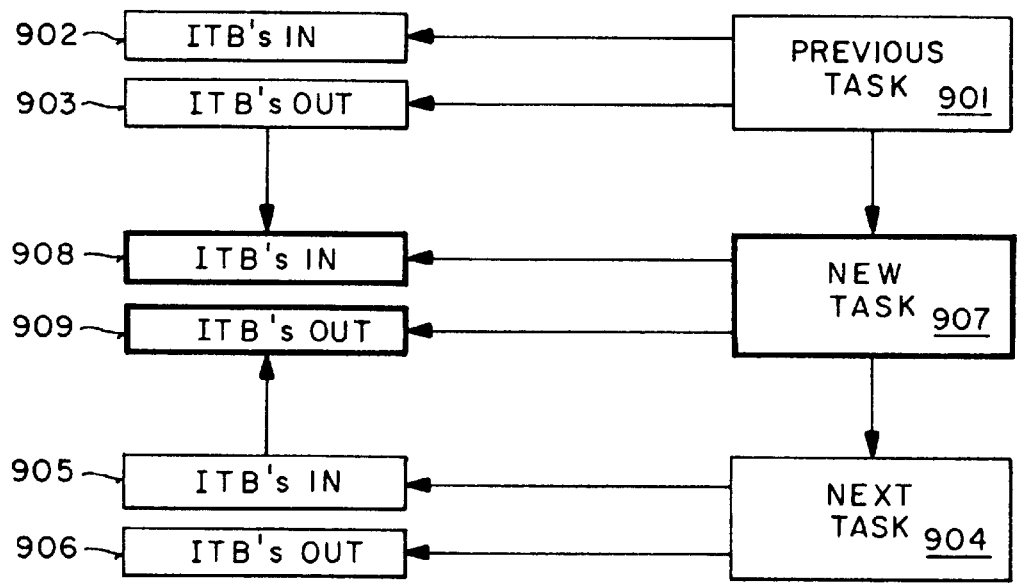

If a task is installed after another task (post-insert), the outgoing ITBs from the previous task become the incoming ITB list for the new task. Likewise, the incoming ITBs from the next task now become the outgoing ITB list for the new task. A diagram of this is shown in FIG. 9B. Referring to FIG. 9B, task 901 has ITB in-list 902 and ITB out-list 903 and next task 904 has an ITB in-list 905 and ITB out-list 906. The new task 907 is added after task 901 and it has an ITB in-list 908 and ITB out-list 909. ITB in-list 908 is identical to the ITB out-list 903 of task 901 and the ITB out-list 909 of task 907 is identical to the ITB in-list 905 of task 904. In effect, the new task bridges between the two ITB lists of the previous and next task, extending the ITB list of the previous task forward.

It is important to note that the FIGS. 9A and 9B do not necessarily represent the data structures associated with the task list. Rather, it is intended to indicate the concept ITB handling. In the currently preferred embodiment, the connecting of identical incoming and outgoing ITB lists is accomplished using pointers which all point to the same structure known as a DSPMap which contains all the ITB information for the tasks. Thus, a new ITB list structure (DSPMap) is only required if it is different from previous lists. The process of changing the ITB lists is described below.

In the currently preferred embodiment of the present invention, each task can import ITBs from previous tasks and can export ITBs to the next task. Usually the import and export lists for a particular task are the same. In the currently preferred embodiment, if a task is installed in the end or beginning of the task list (not relative to existing tasks as before), there will be no preexisting ITBs. This is due to the fact that the first task can only input data from off-chip, since there are no previous tasks to leave data on-chip. Likewise, the last task must move any output data off-chip, since there are no tasks following it to receive data left on-chip. Therefore, there is no need for ITB's in either case. In the currently preferred embodiment in both of these cases, the ITB pointers are nil.

When DSP Manager is called to create a new ITB, it adds a new ITB to the ITB out-list of the task. This creates a mismatch between the ITB out-list of the new task and the ITB in-list of the next task, if one exists. This new task essentially opens a new ITB. The next task the client installs will close the ITB. This task is installed directly after the open task. Using the rules described earlier, this task has the same ITB in-list as the previous task installed and same ITB out-list as the ITB in-list of the task following it (nil if there is no following task). This is shown in FIG. 9.

Figure 10:
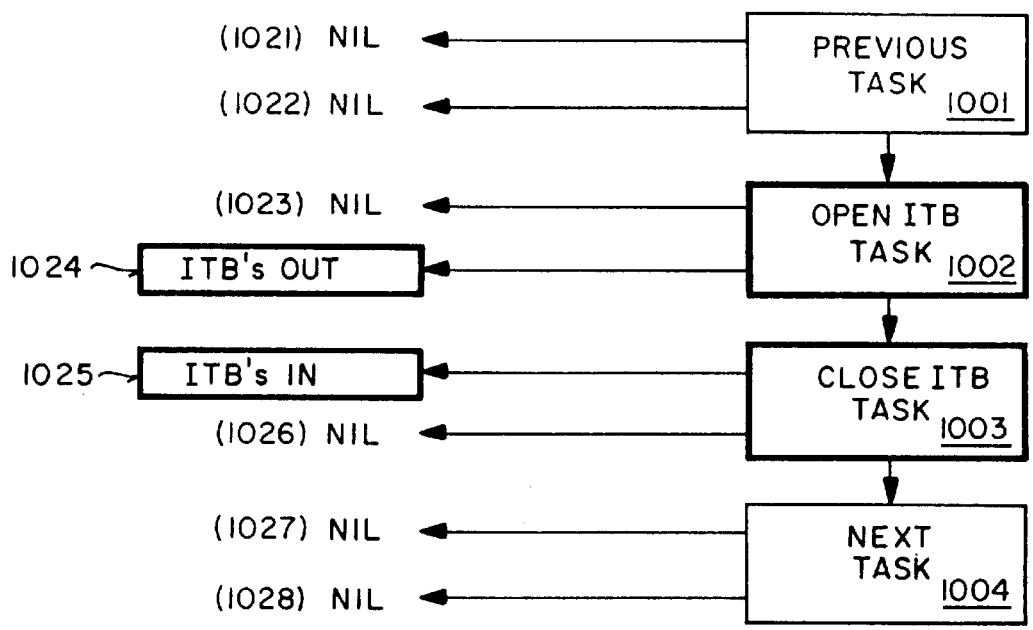
FIG. 10 illustrates the structure and methodology of creating an inter-task buffer according to the present invention.

Referring to FIG. 10, open ITB task 1002 is installed in the task list after previous task 1001. The ITB in-list 1021 and ITB out-list 1022 for previous task 1001 are nil. Therefore, an ITB has not been created. With the installation of open task 1002, an ITB is opened. The ITB in-list 1023 for open task 1002 is nil because the ITB out-list 1022 for the previous task in the task list, previous task 1001, is nil. The ITB out-list 1024 for open task 1002 was initially nil when the task was first created, but when the new ITB was added, the ITB out-list was built, and contains the reference to the new ITB. With the installation of close task 1003, the ITB opened by open task 1002 closes. This is because the ITB in-list 1025 of close task 1003 contains the same ITB list as ITB out-list 1024 (the new ITB), and the ITB out-list 1026 is the same as the ITB in-list for next task 1004 (nil). Any additional tasks installed between the open ITB task 1002 and close ITB task 1003 will have the new ITB in both its ITB in- and out-lists, and thus can utilize the new ITB.

Additional ITB's can be added using the same mechanism. Thus, a new task may be added to the list, and another ITB may be added to its out-list. This task will open the additional ITB. Another new task is installed after it will close the ITB. Any additional tasks installed between the two will have access to the new ITB as well as the previous ITB.

In the currently preferred embodiment of the present invention, required new ITBs should be opened by the first task installed and should always be closed by the second task installed by an application. Any other tasks that need to use the ITB should then be installed between the open and close tasks. It is important to note that multiple applications can install tasks at the same time. Each application must take care of its own ITB's. Applications have no information about the ITB's other applications have set up, since they cannot pre-install or post-install against tasks they do not know about—they must install tasks before or after known tasks (system tasks), or install at the head or tail of the list. If they install relative to system tasks, they know about and have access to any ITB's set up by the system task they install relative to, such as sound ITB's. Otherwise, they install with no ITB's at the head or tail of the task list. In either case, additional ITB's specific for use by that application may be added in the manner described.

ITB connections are made by the client just like other connections using the Connection Manager. This is accomplished by making the connection between module I/O buffers and ITB's in the DSPMap. In the currently preferred embodiment, the DSPMap structure represents the ITB's as section structures within the DSPMap. Furthermore, cache memory is reserved for each ITB buffer, using the mechanism described above. The DSPMap provides the information to the cache Allocation Manager of the DSP Manager (FIG. 2) which, in turn, makes the ITB connections and prevents overrun of the reserved memory.

Execution of Modules/Tasks

As stated earlier, the DSP (FIG. 1) of the present invention supports two different execution models, AutoCache and DemandCache. The difference between the two models is the caching mechanism. For AutoCache, the caching is done automatically, based on source code flags set up for each section in the module by the programmer. The automatic caching is further aided by a series of standard section macros which set all the necessary flags for the proper caching operation for the section. For example, the New-CodeSection macro sets up a section for a load operation, but not a save operation. Macros also specify the correct bank (bank A or B) and the section data type (i.e., code, 16-bit integer, 32-bit floating point, etc.). Bank A normally contains the program, variables, and table section primary containers. Bank B, on the other hand, normally contains I/O section primary containers. This convention is based on the architecture of the DSP used in the preferred embodiment. Banked memory is used as a means to increase the memory bandwidth—a critical factor in DSP performance.

DemandCache, on the other hand, requires that the programmer explicitly activate the caching functions for each section in his module with the use of DSP Kernel calls. The programmer is responsible for the proper sequencing of these calls. In the currently preferred embodiment, the section with the initial code segment is indicated in the header. For AutoCache, this is loaded on-chip prior to execution. For DemandCache, this section is off-chip when called and, therefore, runs much slower than in AutoCache. However, this section can bootstrap itself into cache memory, if desired.

Both AutoCache and DemandCache utilize one or two section tables constructed by the Allocation Manager during the installation process (two tables if HIHO buffers are used in the module). The section table(s) contain a list of pointers to appropriate containers and is utilized to determine the current location of each section by the module code. These pointers provide the basis for section relative addressing for the present invention. Relative addressing allows the Allocation Manager to allocate sections in the cache, such that there is a minimal amount of buffer movement during the execution of a series of modules or tasks.

The section table(s) for the AutoCache execution model always contain the primary container pointers. In the currently preferred embodiment, these pointers are on-chip for cache sections and work space and off-chip for non-cached sections such as parameter buffers used for host/DSP interaction. The section table(s) do not change during the execution of an AutoCache module.

For DemandCache, the section table pointers are set to the location of the data, if available, when the module is started. The section pointers change as Kernel calls are made to cache and uncache sections. Thus, the table always contains the current location of the section data. The section table can be either off-chip or moved into the on-chip cache for DemandCache.

Section Control Flags

Section flags are associated with each section in a module. The setting of the flags indicate to the Kernel executive which actions are to be undertaken with respect to the buffers designated by the sections.

In the present invention, the flags which control how a section is handled in the currently preferred embodiment by the DemandCache and the AutoCache execution models are listed below. Since the Connection Manager can clear some of the flags when making connections, the flag settings may be different at run-time then indicated in the source code (i.e., the original settings in the module).

The LOAD flag indicates to the execution model that a section should be loaded on-chip. Generally, the LOAD flag indicates a move from one container to another and can be cleared by the Connection Manager to eliminate a buffer move. This occurs when the buffer is already on-chip from the previous module that generated the data.

The CLEAR flag indicates to the execution model that a section should be zeroed or cleared before use. In the currently preferred embodiment, the CLEAR flag should not be set if the LOAD flag is set at run-time, since loading a section and then clearing it is not productive. The CLEAR flag is normally used in conjunction with the SAVE flag. When the buffer is a PRB, the Connection Manager should clear this flag if the PRB already contains data. The Connection Manager will leave the CLEAR flag set if the module is the first to connect to the PRB.

The SAVE flag indicates that the section should be saved off-chip after execution is complete. In essence, the SAVE flag indicates that a reverse move from one container to another is to occur. The SAVE flag is cleared by the Connection Manager to prevent a buffer move. This occurs when the subsequent module desires to use the on-chip buffer as input data.

The STATIC flag indicates that the section is to be allocated using the static allocation method rather than the dynamic allocation method (discussed below). Static allocation is undertaken at installation time by the Allocation Manager. Dynamic allocation is instituted at run-time by the module programmer. The STATIC flag facilitates the connection of buffers for DemandCache execution. In AutoCache, this flag is always set by the loader for every section.

The BANK A and BANK B flags are used to indicate the preference between two separate on-chip cache banks: Bank A and Bank B. As stated earlier, memory banks are often employed in DSP's to facilitate multiple memory transfers in a single instruction. In the currently preferred embodiment, if neither flags are set, external memory is specified for the primary container. In the currently preferred embodiment, if either flag is set, a cached section and on-chip bank preference is specified. In the currently preferred embodiment, if both flags are set, a cached section is indicated. However, in this case, either bank may be used. It should be noted that in the currently preferred embodiment that an error occurs if a static section is specified and no bank flags are set. This is because a static section is by definition on-chip (in the cache). In the currently preferred embodiment, it is also illegal to specify a load or save operation without setting bank flags. Clearly, loading and saving are caching operations, and thus one or more bank preference flags should be set.

Setting Up Buffer Connections

When specifying a section as an input buffer, the LOAD flag should be set, along with a bank flag (i.e., either the BANK A or the BANK B flags). In the currently preferred embodiment, this is usually Bank B. If the section is connected to the section of another module using the Connection Manager, the LOAD flag is cleared if the section is allocated to be already on-chip from the previous module. On the other hand, if the section is allocated off-chip or has been moved off-chip to make space in the cache for an intervening module, the flag is not cleared.

In the currently preferred embodiment, when specifying a section as a PRB, the LOAD, CLEAR and SAVE flags should be set, along with the bank flag. In the preferred embodiment, this is usually the Bank B flag. If the buffer is connected to another module and remains on-chip, the Connection Manager clears the SAVE flag. The CLEAR flag is always cleared except for the first module summing into a PRB. Note that either the LOAD or CLEAR flag is cleared if either the buffer has not been used previously and there is no previous data to load (clear the LOAD flag) or there is previous data and a load is required (clear the CLEAR flag).

Of course, both flags may be cleared—this is the case when there is previous data, but it is already in the cache. When specifying a section as a CRB, only the SAVE flag is set. This can be cleared by the Connection Manager if the next module wants the data left on-chip.

The AutoCache function is indicated by a flag in the module header. When DSP Kernel prepares to execute a module, it enters the pre-cache mode and preloads any sections indicated by the LOAD flag into the section data structure. This may include FIFO reads, if a FIFO has been connected to the section (AIAO to FIFO data flow). Furthermore, any section having its CLEAR flag set in the section structure is also cleared. This is accomplished by the DSP Kernel during the parsing of the section structure. During the loading process, the program code, variables and table section are all loaded into the cache.

Once the pre-cache operation has completed, the initial code section is called. The initial code section is indicated in the module header. The code sections use the section table to access information in the other sections. The programmer obtains the base address of a section by using appropriate Kernel calls or macros. When execution has completed, the module returns control to the DSP Kernel. At this point, post-cache operation is executed. All sections with SAVE flags are copied back to their secondary container sections located by the secondary container pointers. Also, FIFO writes will take place for any section that has a AIAO to FIFO connection.

Table 1 is a summary of run-time AutoCache flag combinations (other combinations are allowed in source code, but are changed to one of the legal combinations shown during the task construction process). The table is divided into three groups. The DSP Manager uses the BANK flag to determine the number of containers. If no BANK flag is set, there is single container allocated off-chip. If one or more of the bank flags are set and either the LOAD or SAVE flag is set, then two containers are used: normally one off-chip and one on-chip. If a connection is made which eliminates the need for a secondary buffer, it is deleted and the section becomes a single container section. It should be noted that the Connection Manager also allows both primary and secondary containers to be on-chip.

| | | FLAGS | | | |
|---|---|---|---|---|---|
| BANK | STATIC | LOAD | SAVE | CLEAR | Comments |
| | | | | | Single Container Case -- Bank flags not set |
| — | * | — | — | — | Off-chip section (parameters, workspace, etc.) |
| — | * | — | — | * | Off-chip initialized workspace |
| * | * | — | — | — | Allocate on-chip workspace |
| * | * | — | — | * | Allocate a cleared on-chip workspace |
| | | | | | Dual Container Case -- One or more bank flags set |
| * | * | — | * | — | Save primary to secondary on exit |
| * | * | — | * | * | Allocate a clear primary on entry, save to secondary on exit |
| * | * | * | — | — | Load primary from secondary on entry |
| * | * | * | * | — | Load primary from secondary on entry, save to secondary on exit |
| | | | | | Illegal cases -- Caching with one container or dynamic allocation |
| — | * | * | ? | ? | Illegal - can't AutoCache with one container |
| — | * | ? | * | ? | Illegal - can't AutoCache with one container |
| — | — | ? | ? | ? | Illegal - can't AutoCache with a dynamic section |
| * | * | * | — | * | Useless/Illegal |
| * | * | * | * | * | Useless/Illegal |

\* = Flag set
— = Flag cleared
? = do not care what flag is set to

Figure 11:
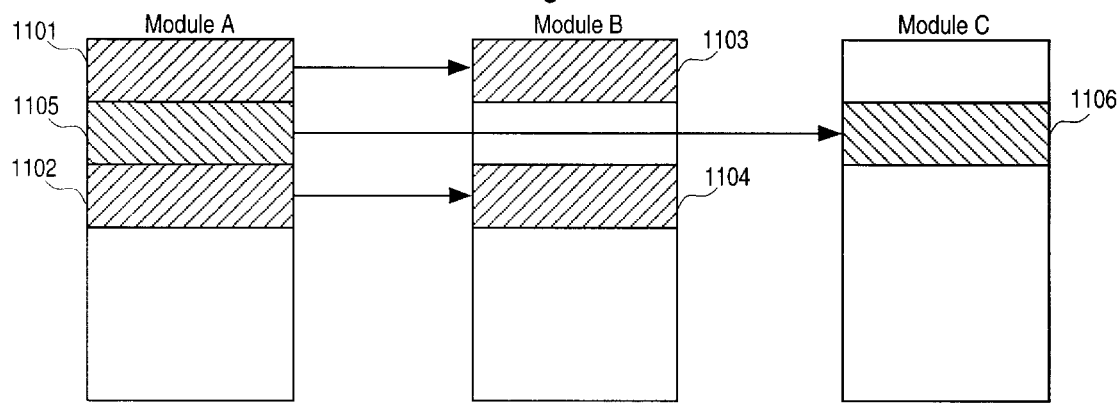
FIG. 11 illustrates an example of the present invention automatically allocating sections.
Figure 12:
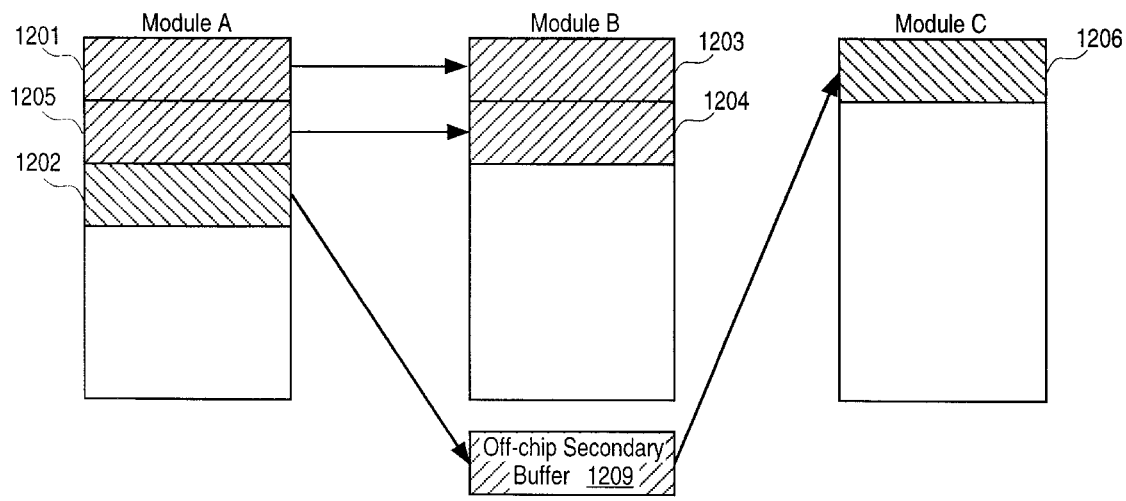
FIG. 12 illustrates an example of the present invention automatically moving sections off-chip to conserve memory.

Use of the mechanism of the present invention to automatically move sections for use by more than one module conserves cache space. An example is shown in conjunction with FIG. 11. Referring to FIG. 11, two buffer sections of module A, 1101 and 1102, are shown connected to buffer sections for module B, 1103 and 1004 respectively. Furthermore, module A also has a buffer, 1105, connected to module C, section 1106. One way the mechanism of the present invention conserves cache space is by automatically moving sections is where the module A–C connection as shown in FIG. 11 breaks up memory for module B in such a way that module B cannot be allocated. To correct this problem, the Connection Manager moves the output data going to module C off-chip to be reloaded back on-chip when module C executes. FIG. 12 illustrates this approach. Referring to FIG. 12, sections 1201 and 1202 of module A are shown connected to sections 1203 and 1204 of module B respectively. The Connection Manager corrects the problem by not clearing the SAVE flag in module A and not clearing the LOAD flag in module C for the connection, and maintaining an off-chip secondary buffer 1209. Also, the two buffers used by module A and B are relocated to be contiguous at the top of the cache (as shown with buffers 1203 and 1204), so there is no "hole" between them for module B, thus freeing up the needed cache memory for module B.

Figure 13:
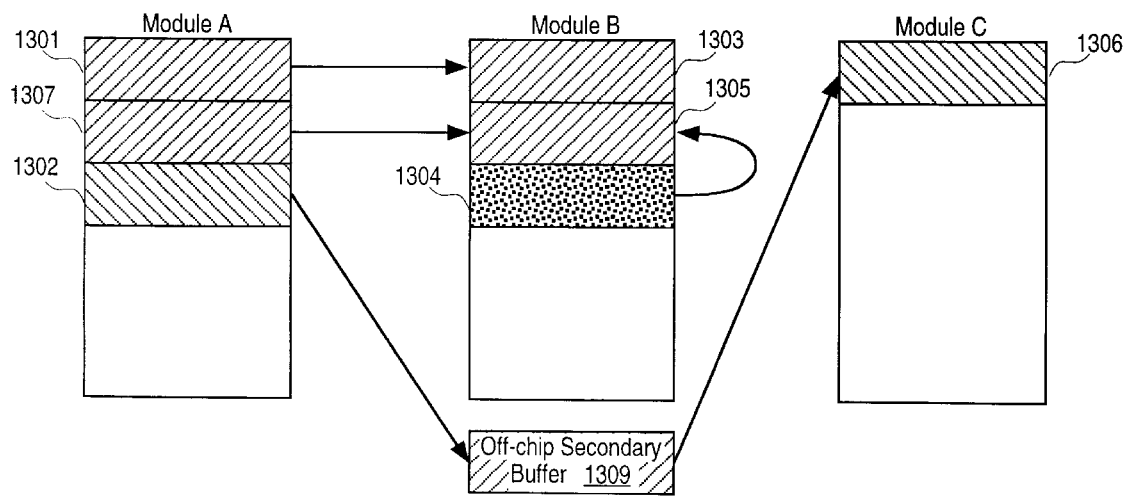
FIG. 13 illustrates an example of the present invention automatically moving sections on-chip to conserve memory and reduce processing overhead.

Another example assumes that the buffers used by both module A and B cannot be moved in module A for some reason (e.g., previous connections prior to module A). In this case, the "hole" between the sections in module B can be eliminated by doing an on-chip move of the data when module A is exited or module B is entered. The elimination of the "hole" can be accomplished by keeping the SAVE flag set in module A and pointing the secondary container to the desired new location on-chip for the data to be moved to, or by keeping the LOAD flag set in module B and pointing the secondary pointer to the module A buffer, and the primary pointer to the desired location for the data. Which option is used depends on the situation. FIG. 13 depicts the example where the buffers utilized in both module A and module B cannot be moved in module A for some reason. Referring to FIG. 13, sections 1301 and 1302 of module A are shown connected to sections 1203 and 1204 of module B respectively. In the example in FIG. 13, it is clear that the LOAD option should be taken to ensure that the data from the A to C connection is saved (in off-chip secondary buffer 1309) prior to moving the other section data on top of it for module B. Then during the cache load, section 1304 is connected to section 1305 and, therefore, section 1306 is connected to off-chip secondary buffer 1309.

In the currently preferred embodiment, buffer moves to resolve connections and memory allocation conflicts are only used for the DemandCache execution model with static sections. This is because the location of dynamic sections is only determined at run time. All sections may be manipulated in this way for AutoCache, since all sections in AutoCache are static.

The DSP Manager determines if two containers are needed by each section during execution. This is done by examining the STATIC flag. If the STATIC flag is set, two containers are initially assumed. Otherwise, only a single container is required (i.e., dynamic allocation). In effect, a static section is allocated in the same way sections are allocated in AutoCache, i.e., at module installation rather than during run-time. Since the STATIC flag is automatically set for all sections at load time in AutoCache, standard section macros that must be static, such as the PRB output sections, should set the flag. Other section macros should not set the flag. If they are used in an AutoCache module, they will become static automatically. If they are used in a DemandCache module, they will be dynamic sections. This eliminates having two sets of macros for section types that are not always static.

While two containers are allocated initially for static sections, the section may end up as a single container section once the Connection Manager has made the connection. Clearly, if neither SAVE or LOAD flags are set, the secondary container is not needed.

Caching with the DemandCache model is accomplished using calls to the DSP Kernel. In the currently preferred embodiment, there are only two calls: PushSection and PopSection. These calls can result in various actions depending on the state of the section flags. Whenever a section is accessed with these calls, the section table may be updated. The DSP Kernel calls PushSection and PopSection reflect the stack nature of DemandCache. The PushSection call is designed to push a section onto one of the cache stacks, and the PopSection call is designed to pop a section off one of the cache stacks. In the currently preferred embodiment, two different stacks exist: the Bank A stack and the Bank B stack. In the currently preferred embodiment, the PushSection and PopSection calls should not be used when neither bank preference flag is set. If this is done in the current embodiment, bank A will be used. In the preferred embodiment, a run-time error would be generated, causing the task to be deactivated.

As in AutoCache, the section table(s) in DemandCache are constructed during the load process by the Allocation Manager. However, the computed values for the section table(s) are different for dynamic and static sections, as described.

Dynamic Sections for Demand Cache

Dynamic sections are allocated by the programmer on the stack. Only a single container is required for these sections. The primary container is always an off-chip buffer, and the secondary container pointer is nil. The PushSection call creates a temporary container on the stack and the PopSection call removes it. Both PushSection and PopSection calls update the current section table. The PushSection call changes the pointer from the primary container to the newly created stack container and PopSection does the opposite. However, it should be noted in the preferred embodiment that the container pointers in the section data structure are not modified by either of the calls. With dynamic sections, all section flags affect the operation of the PushSection and PopSection calls. A PushSection call utilizes the LOAD, CLEAR, and BANK flags. The PopSection utilizes only the SAVE flag.

When a PushSection call is made, a block of memory is allocated in the stack in Bank A of Bank B according to the Bank Preference flags. If the LOAD flag is set, the contents of the primary container is copied onto the stack. Otherwise, the allocated space is work space. If the CLEAR flag is set, the allocated stack space is cleared. In effect, the work space can be specified as cleared or not using this mechanism. Also, note that both flags should not be set.

When a PopSection call is made, if the SAVE flag is set, the stack space is copied back to the primary container. The stack space is then deallocated. An error occurs if the section being popped is not at the top of the stack. In one embodiment, this will cause the program to fail. In the preferred embodiment, a run-time error will be generated, forcing the task to be deactivated.

If access is made to a dynamic section prior to either a PushSection or PopSection call, the primary container in external memory is accessed. Any access between the PushSection and PopSection calls accesses the section in the cache stack.

Note that the programmer has the responsibility to update his own pointers after using a PushSection or PopSection call. The DSP Kernel only updates the section table, not the registers or local variables utilized in the module by the programmer. Note also that run-time errors may be generated with these calls. In the case of a PushSection call, errors can occur where there is insufficient space in the stack or no bank flags are set. In the case of a PopSection call, an error can occur if the section space in the stack is not at the top of the stack. In the preferred embodiment, any of these stack errors cause the DSP Kernel to mark the task as inactive and send a message to the client indicating the type of error.

In the current embodiment, no run-time errors are reported, due to cache space limitations and the speed penalty imposed by the checking. This will change as faster DSP's with larger caches are made available.

In order to make removing the "insufficient stack space" error check for PushSection work without causing system crashes, a "minimum required stack space" value was added to the module header. This allows the DSP Manager to check for sufficient stack space during the cache allocation process.

Static Sections for Demand Cache

Static sections are used in DemandCache as a mechanism to support inter-module and inter-task buffer connections described earlier. This connection mechanism allows creation of generic modules that can be interconnected and used in different ways for different purposes, without prior knowledge of the module programmer.

Static sections are allocated at module installation time by the Allocation Manager. This is very similar to the allocation of sections in the AutoCache model. When a PushSection call is made for a static section, the section table is updated with the primary container pointer. If the LOAD flag is set, the contents of the secondary container are copied to the primary container. Alternately, if the FIFO LOAD flag is set, the FIFO is read to fill the primary container. Otherwise, the primary container is work space. If the CLEAR flag is set, the primary container is cleared. Both flags should not be set at this point.

When a PopSection call is made for a static section, if the SAVE flag is set, the primary container is copied back to the secondary container and the section table is updated with the secondary container pointer. Alternately, if the FIFO SAVE flag is set, the primary container is written to the FIFO. If the SAVE flag is not set, the section table is updated with the secondary container pointer only if it is not nil. The pointer is nil for single container sections and is real for loaded sections. Clearly, static sections resemble those utilized in the AutoCache model, with the exception that the caching operations are carried out under the control of the module programmer, rather than prior to and after module execution.

An error can occur when a FIFO is connected to an AIAO section, and the module code tries to reference the data in the section prior to a PushSection or after a PopSection (i.e. prior to the FIFO read or after the FIFO write). This will access the AIAO buffer, not the FIFO. One means to prevent this programming error is to set up an illegal address in the secondary pointer. This will cause access under the specified conditions to generate an address error.

Connections in Demand Cache

Connections can be made to either dynamic or static sections using the Connection Manager. When making a connection to a dynamic section, the primary containers share local memory with the other connected sections, external to the cache. This type of connection is made without impact to the module programmer. In effect, the primary container pointer is changed to point to some other container and the original container is deleted.

For static sections, connections are made exactly like AutoCache, using two containers. In this manner, connections can be used to pass buffers between modules without the overhead of moving them off-chip and then back on-chip for subsequent module execution. The current section table contains the secondary container pointer until a push section call is made. After a push section call, a section table contains the primary container pointer. When a pop section call is made, the section table is restored to the secondary container pointer.

For some connections, the secondary container is not required. For example, if an input section already is on-chip from a previous module, the LOAD flag is cleared and there is no use for the secondary container. In this case, the secondary container is eliminated and the secondary container pointer is set to nil. The primary container pointer is placed in the section table rather than the nil secondary pointer. It should be noted that neither push section nor pop section call actually do anything in this instance. However, the module programmer does not know what type of connection has been made by the application programmer. Thus, the DemandCache programmer must always make the push and pop section calls in his code for static input and output sections. By making the calls, the correct function is executed, depending on the connections made. This allows the generic connection mechanism to be available to the DemandCache programmer. For example, assume a module with a single input section is connected by the client that is installing the module into a task list. Since this is a "generic" input buffer, the LOAD and STATIC flags are set. If the client makes a connection to the output buffer from a previous module, or to an ITB buffer, the buffer is already on-chip. In this case, the LOAD flag is cleared and the primary container pointer points on-chip to that buffer. The secondary container is deleted, and nil is stored in the secondary pointer. The primary container pointer is placed in the section table. When push section and pop section calls are made, no action is necessary. It should be noted that in this case the programmer may access the buffer prior to the push and after the pop, if desired.

If the client instead makes a connection to a previous module with an off-chip output buffer, the Connection Manager does not clear the LOAD flag, and the secondary container becomes the off-chip output buffer. The secondary container pointer is put into the section table. The push section call loads the off-chip buffer into the on-chip primary container and update the section table pointer. The pop section call restores the secondary container pointer in the section table. Accesses to the section data prior to the push section call goes to the input data off-chip.

In the currently preferred embodiment, static buffer accesses are not recommended prior to a push or after a pop operation, since the buffer may be connected to a FIFO. In this case, any accesses to the buffer prior to a push or after a pop may be illegal, possibly resulting in a bus error. It is not possible to support direct access into the FIFO buffer— only FIFO read and write operations are supported. These occur at the push or pop call, depending on the connection.

Below, Table 2 summarizes the flag combinations for DemandCache at run-time. It should be noted that although it is not illegal to specify a user section that does not have any bank flag set, it is always illegal to push or pop such a section. Other illegal combinations include static sections with no bank preference flags and cache sections (LOAD or SAVE flag) with no bank preference.

| | | FLAGS | | | | |
|---|---|---|---|---|---|---|
| BANK | STATIC | LOAD | SAVE | CLEAR | PushSection | PopSection |
| | | | | | Single Container Dynamic Case - STATIC flag is not set | |
| * | — | — | — | — | Allocate space in stack | Deallocate space in stack |

-continued

| BANK | STATIC | LOAD | SAVE | CLEAR | PushSection | PopSection |
|---|---|---|---|---|---|---|
| * | — | — | — | * | Allocate and clear stack workspace | Deallocate space in stack |
| * | — | — | * | — | Allocate space in stack | Save to primary and deallocate |
| * | — | — | * | * | Allocate and clear stack workspace | Save to primary and deallocate |
| * | — | * | — | — | Allocate and load stack from primary | Deallocate space in stack |
| * | — | * | * | — | Allocate | Save to primary and deallocate |
| | | | | | Single Container Static Case - STATIC flag is set | |
| * | * | — | — | — | No operation | No operation |
| * | * | — | — | * | Clear primary | No operation |
| | | | | | Dual Container Static Case - STATIC flag is set | |
| * | * | — | * | — | Section table change only | Save primary to secondary |
| * | * | — | * | * | Clear primary | Save primary to secondary |
| * | * | * | — | — | Load primary from secondary | Section table change only |
| * | * | * | * | — | Load primary from secondary | Save primary to secondary |
| | | | | | Illegal Cases - if no bank flags are set | |
| — | — | — | — | ? | Off-chip section, Push illegal | Off-chip section, Pop illegal |
| — | * | ? | ? | ? | Static illegal if no bank flag set | Static illegal if no bank flag set |
| — | ? | * | ? | ? | Load illegal if no bank flag set | Load illegal if no bank flag set |
| — | ? | ? | * | ? | Save illegal if no bank flag set | Save illegal if no bank flag set |
| * | — | * | — | * | Useless/Illegal | Useless/Illegal |
| * | — | * | * | * | Useless/Illegal | Useless/Illegal |
| * | * | * | — | * | Useless/Illegal | Useless/Illegal |
| * | * | * | * | * | Useless/Illegal | Useless/Illegal |

\* = Flag set
— = Flag cleared
? = do not care what flag is set to

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, reference to the details of the preferred embodiments are not intended to limit the scope of the claims which themselves recite only those features regarded as essential to the invention.

Thus, a method and means for automatically allocating memory for multiple program data structures is desirable.

We claim:

1. A method of automatically allocating memory for a plurality of executable programming structures for being utilized by a processor having a cache memory, each of said executable programming structures having executable program code to perform a predetermined function upon execution and having at least one input/output (I/O) section containing at least one reference designating an I/O buffer for transferring a data stream, each of said executable programming structures for being coupled to another of said executable programming structures to perform a specific function upon use by said processor, said method comprising the steps of:

specifying at least one connection between a first and second of said executable programming structures; and directing a first I/O buffer reference specified in said first executable programming structure and a second I/O buffer specified in said second executable programming structure to a common memory location during caching prior to execution of said first and second executable programming structures, such that the common memory is allocated in the cache memory for use by said first and second executable programming structures upon execution of said first and second executable programming structures, such that data is maintained in the common memory location when exiting said first executable programming structure and entering said second executable programming structure.

2. The method as defined in claim 1 wherein said common memory location is a frame synchronous buffer, wherein the data stream from said first executable programming structure is coupled to said second executable programming structure, such that data is transferred into said buffer by said first executable programming structure during a first frame then said buffer is used by said second executable programming structure as input data in a second frame immediately subsequent to the first frame.

3. The method as defined in claim 2 wherein said frame synchronous buffer is an All-In/All-Out (AIAO) buffer that transfers a frame of data between the first executable programming structure and the second executable programming structure during a given frame.

4. The method as defined in claim 1 wherein said step of specifying includes specifying whether said reference designates said I/O buffer as an input buffer, an output buffer or both.

5. The method as defined in claim 1 wherein the operation of said I/O section is controlled by a plurality of flags, and further wherein said step of specifying includes setting said flags, such that said reference designates the characteristics of said buffer.

6. The method as defined in claim 1 wherein each of said executable programming structures comprises a module.

7. The method as defined in claim 1 wherein a set of one or more of said executable programming structures comprises a task.

8. A method for creating an inter-task buffer comprising the steps of:

adding a first task that specifies a first buffer by a first pointer, wherein said buffer is added to an inter-task buffer out list, such that said first new task opens said buffer; and allocating a location in memory for the first buffer;

adding a second task directly after said first task that specifies a second buffer by a second pointer, wherein the step of adding a second task comprises the step of directing the second pointer to the first buffer allocated in memory, such that said second new task closes said inter-task buffer; and, adding zero or more additional tasks between the open and close task that utilize the first buffer, such that multiple tasks use the first buffer.

9. The method as defined in claim 8 wherein if said new task closes said one inter-task buffer and said one inter-task buffer is the only one, then the output is coupled to nil.

10. The method as defined in claim 8 wherein said first buffer is an All-In/All-Out (AIAO) frame synchronous buffer, wherein the data stream from said first task is coupled to said second task, such that data is transferred into said buffer by said first task during a first frame then said buffer is used by said second task as input data in a second frame subsequent to the first frame.

11. A method for creating a task list having a plurality of tasks, wherein each of said tasks has at least one input and at least one output, said method comprising the steps of:

inserting a new task into said task list; and connecting said new task into said task list, wherein if a first task immediately preceding said new task in said task list has its output directed to at least one inter-task buffer then an input of said new task is directed to said at least one inter-task buffer of said first task by directing an input reference pointer to said at least one inter-task buffer, and further wherein if a second task immediately proceeding said new task in said task list is directed to said one inter-task buffer then said output of said new task is directed to one inter-task buffer of said proceeding task by directing an output reference pointer to said at least one inter-task buffer, such that the memory is allocated automatically, and further wherein the steps of inserting the new task and connecting said new task occur prior to execution of tasks in the task list.

12. The method as defined in claim 11 wherein if said new task opens a first inter-task buffer then the inter-task input of said new task is nil.

13. The method as defined in claim 11 wherein said inter-task buffer is an All-In/All-Out (AIAO) frame synchronous buffer, wherein the data stream from said first task is coupled to said second task, such that data is transferred into said buffer by said first task during a first frame then said buffer is used by said second task as input data in a second frame subsequent to the first frame.

14. A method of allowing a First-In/First-Out (FIFO) to connect to an AIAO input or output buffer, said method comprising the steps of:

converting an AIAO secondary container function to a FIFO access;

attaching a FIFO status to a AIAO section;

setting at least one flag associated with said AIAO section;

specifying a direction of the data flow.

15. The method as defined in claim 14 wherein if the AIAO is an input buffer then a FIFO load flag and a AIAO section load flag are set, such that the data flow is from the FIFO to the AIAO.

16. The method as defined in claim 14 wherein if the AIAO is an output buffer then a AIAO section save flag and a FIFO save flag are set, such that data is saved to the FIFO.

17. A method of allocating a Half-In/Half-Out (HIHO) of a predetermined size to connect to an AIAO input or output buffer, said method comprising the steps of:

converting a AIAO secondary container function to a HIHO access;

setting flags for a header of a module such that two section tables are allocated; and setting the flags associated with a HIHO section of the HIHO to allow access to the two section tables individually.

18. The method as defined in claim 17 further comprising the step of setting each section for access every other frame.

19. The method as defined in claim 18 wherein the step of setting each section comprises the step of setting a base address in one of said sections and the base address plus one half the HIHO size in the other section.

20. A method for allocating memory in a processing system comprising the steps of:

providing at least one executable programming data structure having executable program code to perform a predetermined function upon execution and having at least one input buffer designator and at least one output buffer designator;

specifying a direction of data flow;

connecting an input buffer for use by said at least one executable programming data structure during execution as designated by said at least one input buffer designation to a first buffer by allocating a first common memory location and an output buffer as designated by said at least one output buffer designation to a second buffer by allocating a second common memory location, such that a connection is made which enables the transfer and processing of data from the first buffer to the second buffer during execution of said at least one executable programming data structure.

21. The method as defined in claim 20 wherein said step of connecting comprises connecting the input buffer to said structure to a FIFO and the output buffer is coupled to a FIFO to create a FIFO to FIFO connection.

22. The method as defined in claim 20 wherein said step of connecting comprises connecting the output buffer from a previous structure into the input buffer of said structure and connecting the input buffer of a third structure from the output buffer of said structure to create an AIAO to AIAO connection.

23. The method as defined in claim 20 wherein said step of connecting comprises connecting the input buffer of said structure to a FIFO and the output buffer of said structure to an AIAO buffer to create a FIFO to AIAO connection.

24. The method as defined in claim 20 wherein said step of connecting comprises connecting the input buffer of said structure to an AIAO and the output buffer of said structure to an FIFO to create an AIAO to FIFO connection.

25. The method as defined in claim 20 wherein said step of connecting comprises connecting the input buffer of said structure to an AIAO and the output buffer of said structure to an HIHO to create an AIAO to HIHO connection.

26. The method as defined in claim 20 wherein said step of connecting comprises connecting the input buffer of said structure to an FIFO and the output buffer of said structure to an HIHO to create an FIFO to HIHO connection.

27. The method as defined in claim 20 wherein said step of connecting comprises connecting the input buffer of said structure to an HIHO and the output buffer of said structure to an AIAO to create an HIHO to AIAO connection.

28. The method as defined in claim 20 wherein said step of connecting comprises connecting the input buffer of said structure to an HIHO and the output buffer of said structure to an FIFO to create an HIHO to FIFO connection.

29. The method as defined in claim 20 wherein said step of connecting comprises connecting the input buffer of said structure to an HIHO and the output buffer of said structure to an HIHO to create an HIHO to HIHO connection.

30. A method of making connections between a plurality of executable programming data structures that are executed in a processing system having a caching mechanism, wherein said data structures comprise executable program code to perform a predetermined function upon execution and at least one section and wherein said at least one section is associated with a primary container and capable of being associated with a secondary container, wherein the caching mechanism moves data between the secondary and primary containers prior to and after execution of the structure, wherein said at least one section is associated with a plurality of flags and type data, said plurality of flags including at least a save flag, a load flag and a clear flag, said method comprising the steps of:

specifying said at least one section as a buffer;

specifying a direction of the data flow to indicate the function of the buffer; and setting the flags, such that when said caching mechanism caches said plurality of executable programming data structures and the plurality of executable data structures are executed the data flow moves between the secondary and primary containers according to the direction.

31. The method as defined in claim 30 wherein the modules are cached automatically.

32. The method as defined in claim 31 wherein if the section is a static section and the save flags is set then the contents of the primary container are saved to the secondary container on exit.

33. The method as defined in claim 31 wherein if the section is a static section and the save and clear flags are set then the primary container is cleared on entry and the primary container is saved to the secondary container on exit.

34. The method as defined in claim 31 wherein if the section is a static section and the load flag is set then the primary container is loaded from the secondary container on entry.

35. The method as defined in claim 31 wherein if the section is a static section and the load and save flags are set then the primary container is loaded from the secondary container on entry and the primary container is saved to the secondary container on exit.

36. The method as defined in claim 30 wherein said buffer is an All-In/All-Out (AIAO) frame synchronous buffer, wherein the data stream from a first of said plurality of executable programming structures is coupled to a second of said plurality of executable programming structures, such that data is transferred into said buffer by said first of said plurality of executable programming structures during a first frame then said buffer is used by said second of said plurality of executable programming structures as input data in a second frame immediately subsequent to the first frame.

* * * * *